United States Patent
Yuzawa et al.

(10) Patent No.: US 7,590,949 B2
(45) Date of Patent: Sep. 15, 2009

(54) INFORMATION PROCESSING SYSTEM AND INFORMATION PROCESSING METHOD THAT SEARCHES FOR PERIPHERAL INFORMATION

(75) Inventors: Hideto Yuzawa, Kanagawa (JP); Yoshifumi Matsunaga, Kanagawa (JP); Akinori Komura, Kanagawa (JP); Tomokazu Yago, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 249 days.

(21) Appl. No.: 11/444,436

(22) Filed: Jun. 1, 2006

(65) Prior Publication Data
US 2007/0136249 A1 Jun. 14, 2007

(30) Foreign Application Priority Data
Dec. 9, 2005 (JP) ............................. 2005-356725

(51) Int. Cl.
*G06F 3/00* (2006.01)
(52) U.S. Cl. .................. 715/821; 715/702; 715/737; 715/739; 715/764; 715/780; 715/810; 715/822; 715/823; 715/832; 715/856; 715/860; 715/863; 709/217; 707/3; 707/6
(58) Field of Classification Search ......... 715/821–823, 715/702, 737, 739, 764, 780, 810, 832, 856, 715/860, 863; 709/217; 707/3, 6
See application file for complete search history.

(56) References Cited

U.S. PATENT DOCUMENTS

| | | | | |
|---|---|---|---|---|
| 5,982,370 A * | 11/1999 | Kamper | ...................... | 715/760 |
| 6,341,306 B1 * | 1/2002 | Rosenschein et al. | ....... | 709/217 |
| 6,584,469 B1 * | 6/2003 | Chiang et al. | ............... | 707/102 |
| 6,785,670 B1 * | 8/2004 | Chiang et al. | .................. | 707/3 |
| 6,847,961 B2 * | 1/2005 | Silverbrook et al. | ........... | 707/3 |
| 2007/0174286 A1 * | 7/2007 | Seitz et al. | .................... | 707/10 |

FOREIGN PATENT DOCUMENTS

| JP | A-10-222478 | 8/1998 |
|---|---|---|
| JP | A-2000-187545 | 7/2000 |

* cited by examiner

*Primary Examiner*—Kieu Vu
*Assistant Examiner*—Patrick F Riegler
(74) *Attorney, Agent, or Firm*—Oliff & Berridge, PLC (57) ABSTRACT

An information processing system including a support section that displays a document in a given region and supports creation of the document, an acceptance section that accepts a search request in relation to a search target when the search target is selected from the document in the given region, and a search section that searches for information related to the search target based on the search request in relation to the search target.

18 Claims, 13 Drawing Sheets

```
              [0]  [1]  [2]  [3]  [4]  [5]
ARRAY  a[ ] =  R    F    I    D    t    a    g
```

FIG. 7B

```
              [0]  [1]  [2]  [3]  [4]  [5]  [6]
ARRAY  a[ ] =  g    a    t    D    I    F    R
```

INFORMATION PROCESSING SYSTEM AND INFORMATION PROCESSING METHOD THAT SEARCHES FOR PERIPHERAL INFORMATION

CROSS-REFERENCE TO RELATED APPLICATION

This application claims priority under 35 USC 119 from Japanese patent document, 2005-356725, the disclosure of which is incorporated by reference herein.

BACKGROUND

1. Technical Field

The present invention relates to an information processing system and an information processing method for searching for related peripheral information.

2. Related Art

For operations in multiple computers in cooperation with each other, a technology in which each window management data of each computer is merged, the management data is shared by the multiple computers, and integrated operations are enabled has been suggested. In such computer units, in the case that the multiple computers are connected to one network, the multiple computers can share the whole of multiple display units and overall management is enabled. For example, when there are a computer A and a computer B, by a mouse or a keyboard of the computer A, operating the computer B is enabled in addition to operating the computer A.

Further, a system in which in multiple computers in cooperation with each other, communication modules for communicating utilization states of devices connected to the respective computers to each other and a cooperation management section for managing cooperated operations among the respective computers are included, and displaying messages among the computers is enabled has been suggested. In such computer units, a cooperated processing system in multiple PCs, in which, in the case that multiple computers are connected to one network, the multiple computers share the whole of multiple display units, overall management is enabled, and operations are enabled as if the multiple PCs are one PC is embodied.

However, in the foregoing technologies, operations in one computer are available in multiple computers. For example, when peripheral information related to an original operation is desired to be presented, operations other than the original operation, such as newly starting an application, inputting necessary information, and performing operations to start processing are generated. In result, it is necessary to interrupt processing the original operation. Therefore, there is a problem that the peripheral information is not able to be obtained effectively while the original operation is performed.

SUMMARY

The invention has been made in view of the above problems and provides an information processing system and an information processing method, which can effectively obtain peripheral information by only operations associated with an original operation.

According to an aspect of the present invention, there is provided an information processing system including: a support section that displays a document in a given region and supports creation of the document; an acceptance section that accepts a search request in relation to a search target when the search target is selected from the document in the given region; and a search section that searches for information related to the search target based on the search request in relation to the search target.

BRIEF DESCRIPTION OF THE DRAWINGS

Embodiments of the present invention will be described in detail based on the following figures, wherein.

DETAILED DESCRIPTION

A description will now be given of embodiments of the invention.

First Embodiment

Figure 1:
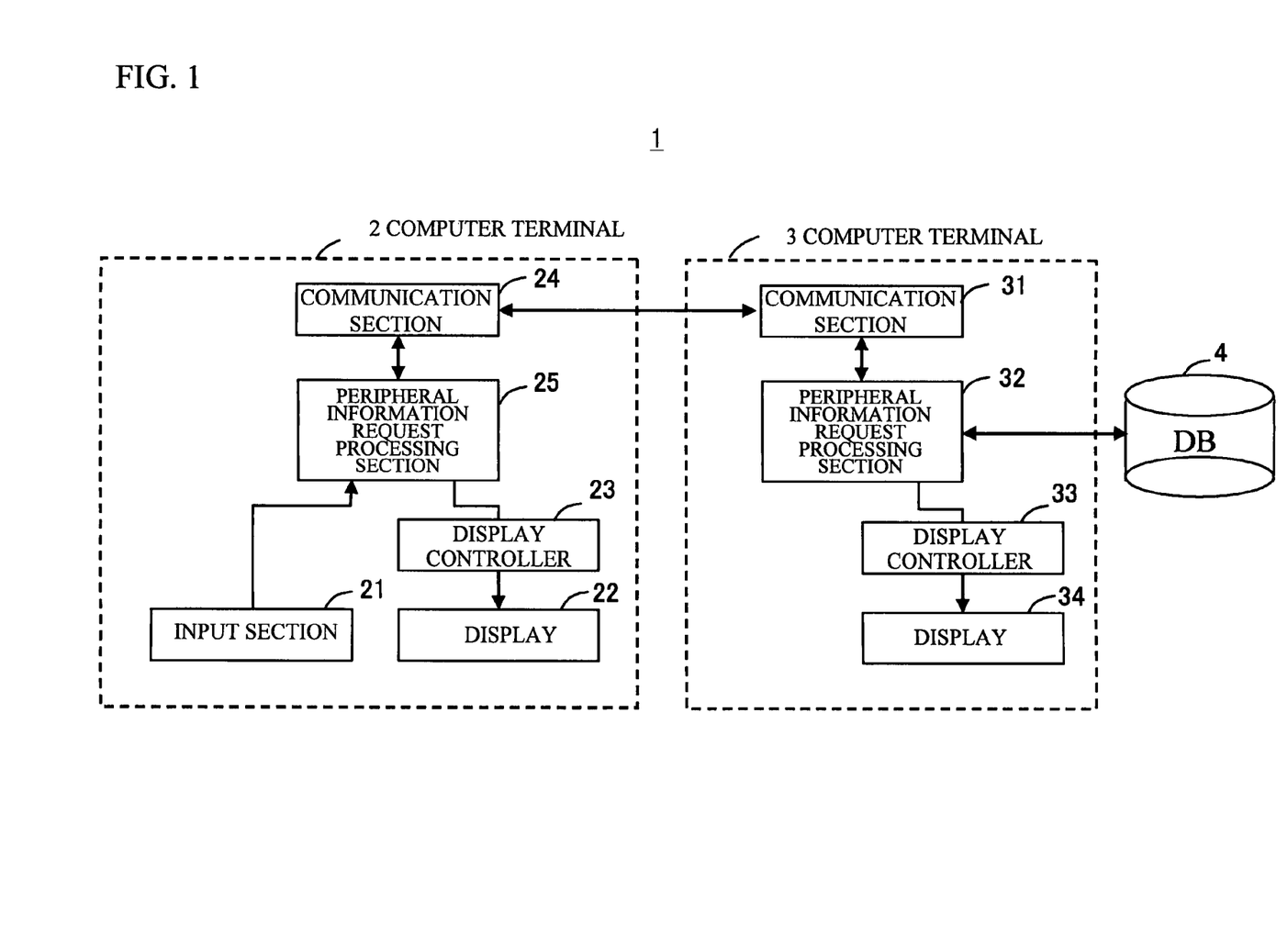
FIG. 1 is a structure diagram of an information processing system, according to a first embodiment of the invention.

FIG. 1 is a structure diagram of an information processing system according to a first embodiment of the invention. An information processing system 1 has computer terminals 2, 3 and a database 4. The information processing system 1 allows peripheral information to be presented without generating new operations during processing an original operation when both processing the original operation and processing the related peripheral information are performed concurrently. The computer terminal 2 has an input section 21, a display 22, a display controller 23, a communication section 24, and a peripheral information request controller 25. The input section 21 is composed of, for example, a keyboard, a mouse, a touch panel or the like. The display 22 is composed of, for example, a display such as an LCD (Liquid Crystal Display). The display controller 23 controls display of the display 22.

The peripheral information request controller 25 provides a user multitasking of documentation and search. The peripheral information request controller 25 issues instructions to display a document in a given region of the display 22, and supports creating the document. Further, the peripheral information request controller 25 has a memory as a retention section for temporarily retaining a search request in relation to a search target. The peripheral information request controller 25 senses a request signal by pressure instructions by the input section 21 such as a mouse, a keyboard, and a touch panel.

When the search target is selected from the document in the given region of the display 22, the peripheral information request controller 25 judges that the search target is designated, and accepts the search request in relation to the search target. For selecting the search target, for example, there is a method that the search target is selected so that the search target can be visually identified. For example, when part of the displayed document information is highlighted, the peripheral information request controller 25 judges that the search target is selected. The peripheral information request controller 25 functions as a support section and an acceptance section. The communication section 24 has a function to control communications by an LAN (Local Area Network), infrared and the like.

The computer terminal 3 has a communication section 31, a peripheral information request processing section 32 as a search section, a display controller 33, and a display 34. The communication section 31 has a function to control communications by an LAN, infrared and the like similarly to the communication section 24. The peripheral information request processing section 32 autonomously searches the database 4 for peripheral information related to the search target based on the search request in relation to the search target. The display controller 33 has a function to calculate a display method based on the received request signal and a state in the computer terminal 3. The display controller 33 displays the peripheral information related to the search target based on the association degree in relation to the search target (association degree in relation to the original operation).

Figure 2:
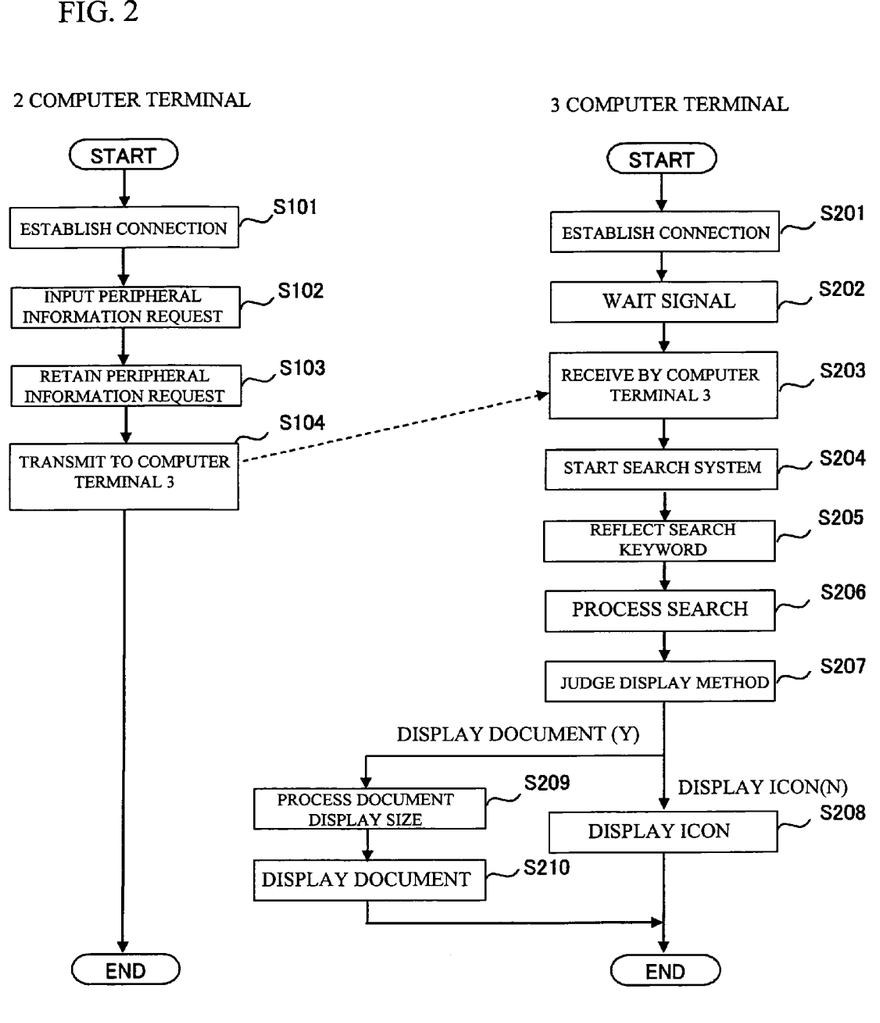
FIG. 2 is a flowchart of processing of the information processing system, according to the first embodiment of the invention.
Figure 3:
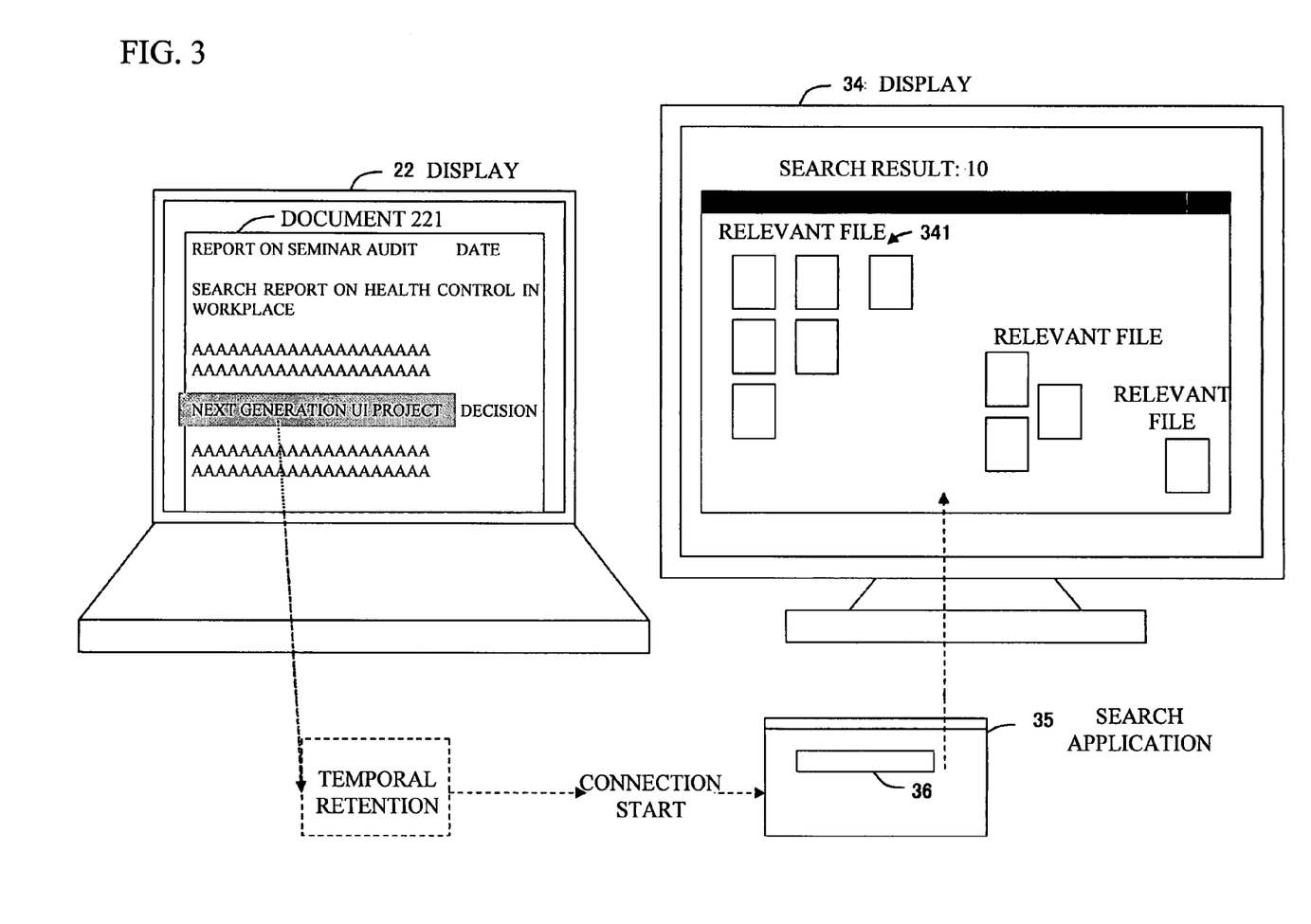
FIG. 3 is an explanation drawing which shows a model of screens in operation of displays, according to the first embodiment of the invention.
Figure 4:
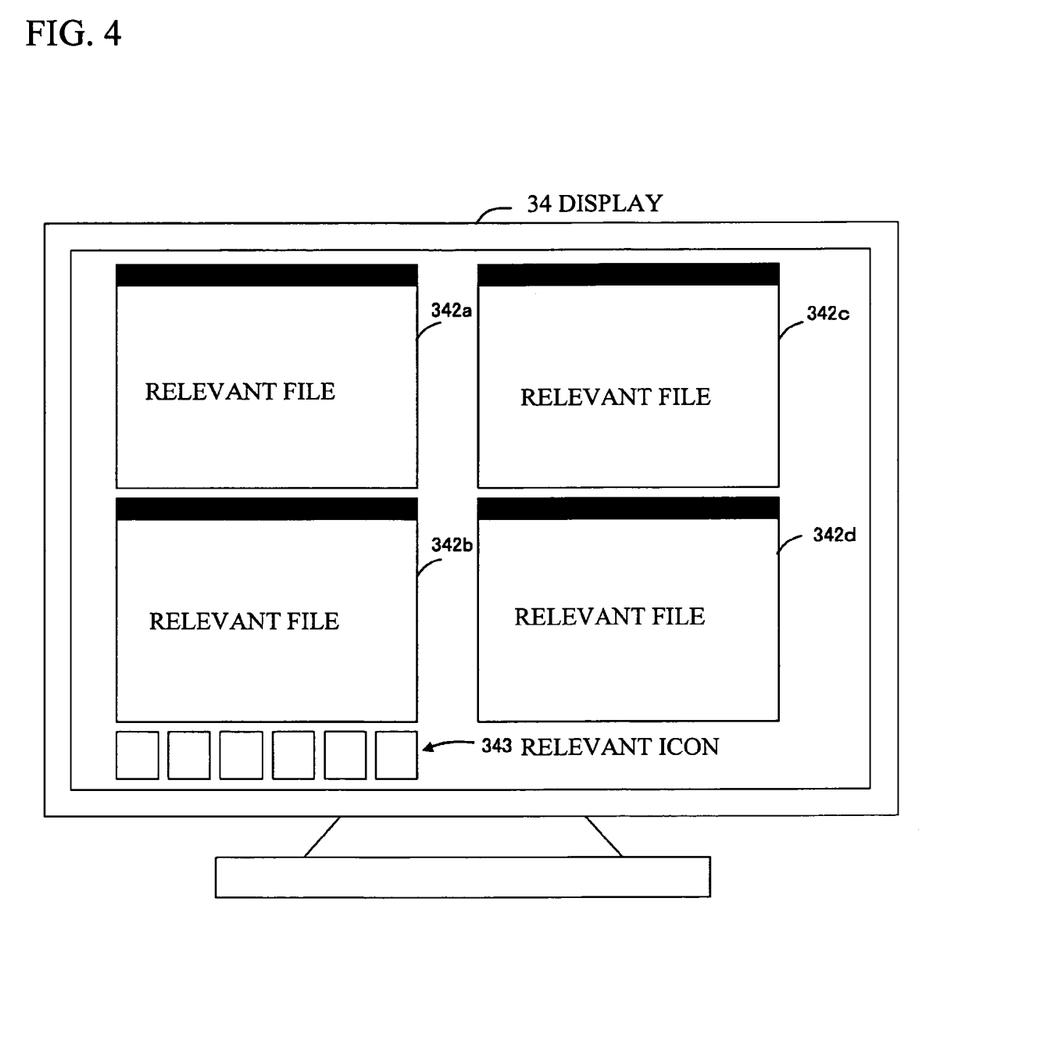
FIG. 4 is a view showing other display example of a display, according to the first embodiment of the invention.

Next, descriptions will be given of operations of the information processing system according to the first embodiment of the invention. FIG. 2 is a chart showing a flow of processing of the information processing system according to the first embodiment of the invention. FIG. 3 is an explanation drawing which shows a model of screens in operation of the displays according to the first embodiment of the invention. FIG. 4 is a view showing other display example of the display 34. Here, as an example, descriptions will be given of a case that when a document is shown in the computer terminal 2 which is a notebook PC, peripheral information related thereto is autonomously searched for and displayed in the computer terminal 3 which is a desktop PC in cooperation with the computer terminal 2 by simple instructions.

One of the examples corresponding to the first embodiment is as follows. A sales representative types necessary items or session minutes which are confirmed when he or she is away from the office into the computer terminal 2 as a memo, then returns to the office and reads over the memo on his or her desk. Assuming that he or she encounters a document or words which are desired to be referred in the middle of reading over the memo in the computer terminal 2. In this case, generally, if a file related to an item necessary to be confirmed is located in the computer terminal 3, and a storage location thereof is ambiguous or multiple related files are desired to be referred, it is necessary that he or she once stops operations on the computer terminal 2, shifts his or her operation to the computer terminal 3, starts a file search application, retypes the same words as the words described in the computer terminal 2 into the search application, and starts respective multiple related files one by one. Therefore, in the past system, it has not been possible to concurrently process the operation to read the memo in the computer terminal 2 and the operation to search for the peripheral information stored in the computer terminal 3.

In FIG. 2, first, the computer terminals 2 and 3 establish connection (steps S102 and 201). The computer terminal 3 retains a state waiting a signal (step S202). While a user views a document 221 by means of the display 22 of the computer terminal 2, when the user encounters a phrase necessitating peripheral information, for example, when the user encounters "next generation UI project," the user highlights the phrase by operating a mouse (step S102). The highlighted phrase is temporarily retained in the memory inside the peripheral information request controller 25 of the computer terminal 2 (Step S103). Next, search request data retained in the memory is transmitted to the computer terminal 3 by the communication section 24 (step S104). The computer terminal 3 receives the search request data by means of the communication section 31 (step S203). The peripheral information request processing section 32 starts a search application 35 of FIG. 3 based on the received search request data (step S204). Otherwise, it is possible to start multiple search applications, and the peripheral information of multiple targets is searched for on the Internet, on an intranet, and in local files in a single instruction.

Next, the peripheral information request processing section 32 reflects the search request data in a search text box 36 (step S205), and performs search processing (step S206). The display controller 33 judges a method of displaying search results (step S207). Here, when the number of the search results is small (or a given set value or less), the display controller 33 selects document display. Next, the display controller 33 decides a document display size from a screen size of the computer terminal 3 and the number of the search results (step S209). For example, when the number of search result files is 4, the display controller 33 displays the four documents in the tetrameric screen of the computer terminal 3 as shown in FIG. 4. The display controller 33 displays documents on the display 34 based on the decided results (step S210).

As shown in FIG. 3, when the number of the search results is large, the display controller 33 selects icon display in judging a display method, and displays the search results on the display 34 in the form of an icon (341) as shown in the screen of the computer terminal 3 (step S208). Further, as shown in FIG. 4, it is possible to combine document display and icon display. In this case, it is possible that several search results are displayed in the form of a document (342*a* to 342*d*) and the remaining search results are displayed in the form of an icon (343). Thereby, the user can present the peripheral information on the periphery by only highlighting words in the memo described in the computer terminal 2 with a mouse as if he or she reads the memo while he or she draws a line on a paper document with a pen without other operations. Further, since the peripheral information is displayed on the different display, the memo described in the computer terminal 2 is not overlaid by the peripheral information and thus the user can view all displays at a time.

Second Embodiment

Figure 5:
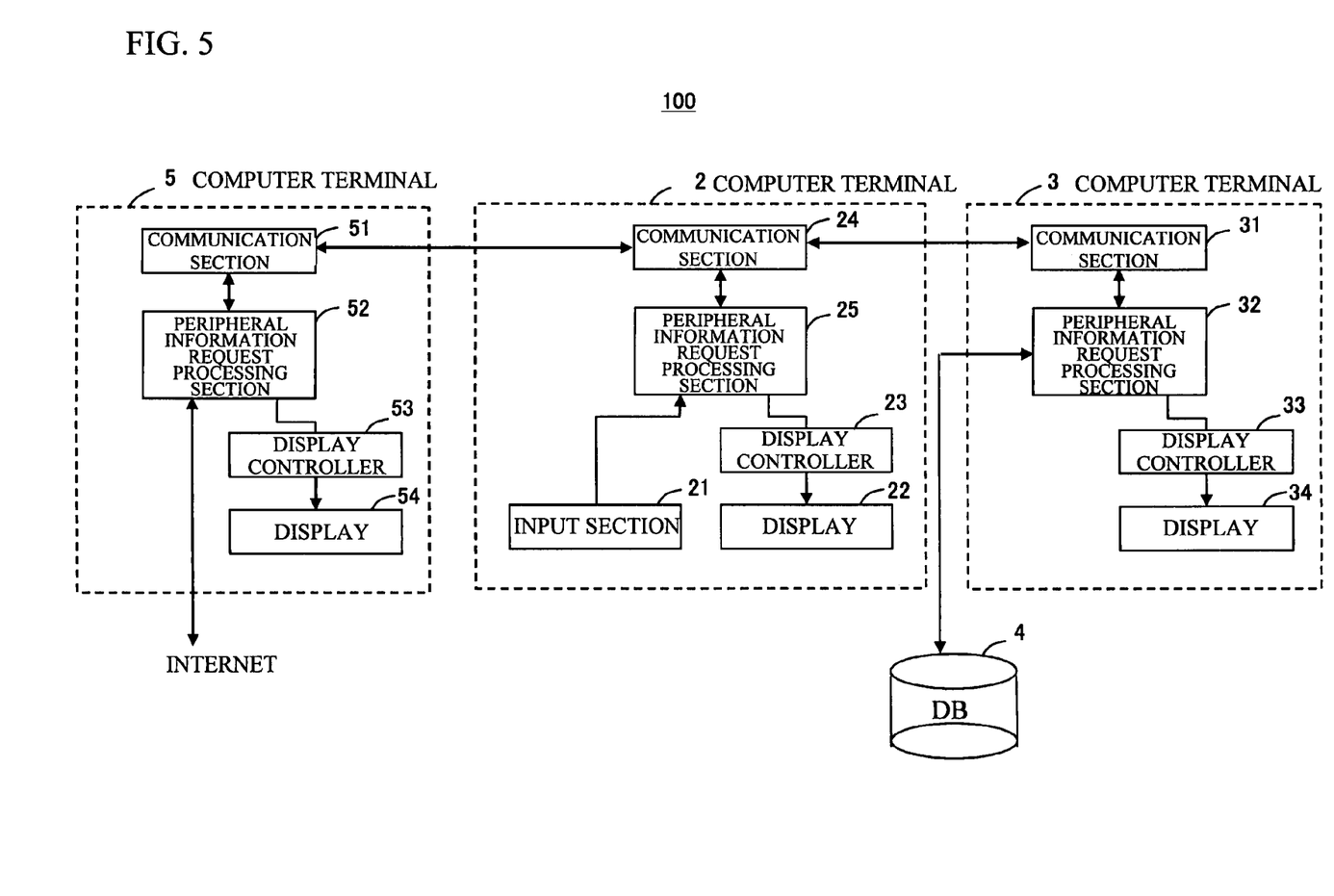
FIG. 5 is a diagram showing a structure of an information processing system 100, according to a second embodiment of the invention.
Figure 6:
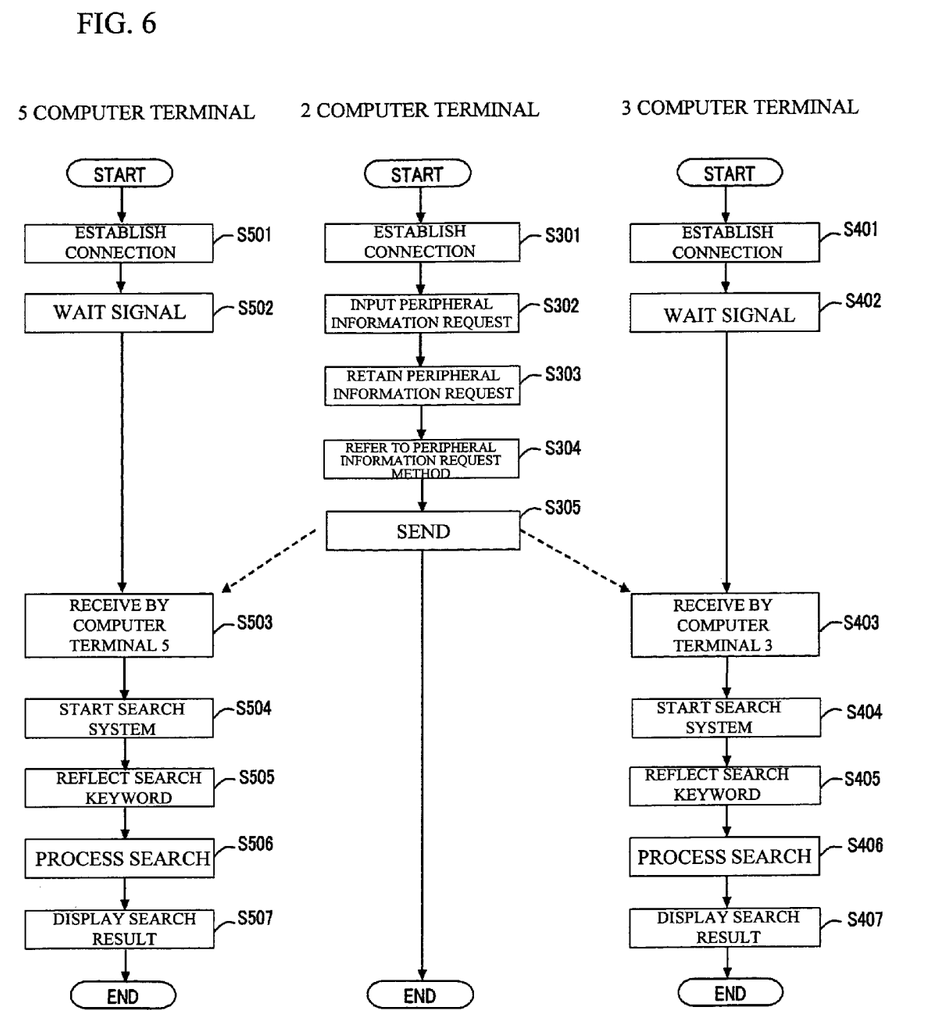
FIG. 6 is a flowchart of processing of the information processing system, according to the second embodiment of the invention.
Figure 7A:
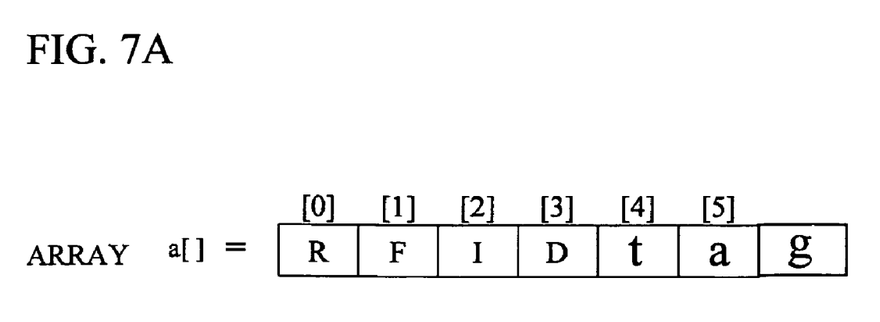
FIGS. 7A and 7B are drawings for explaining a method of judging a highlight direction, according to the second embodiment of the invention.
Figure 7B:
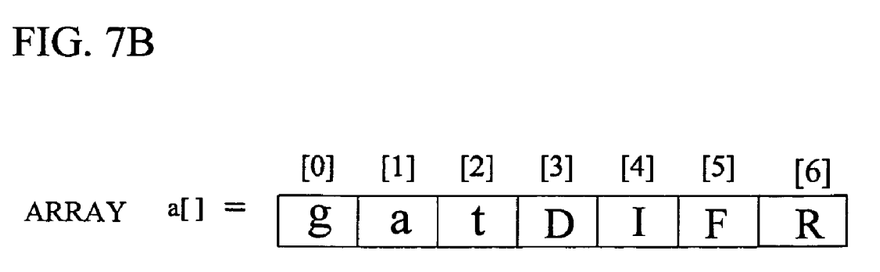
Figure 8:
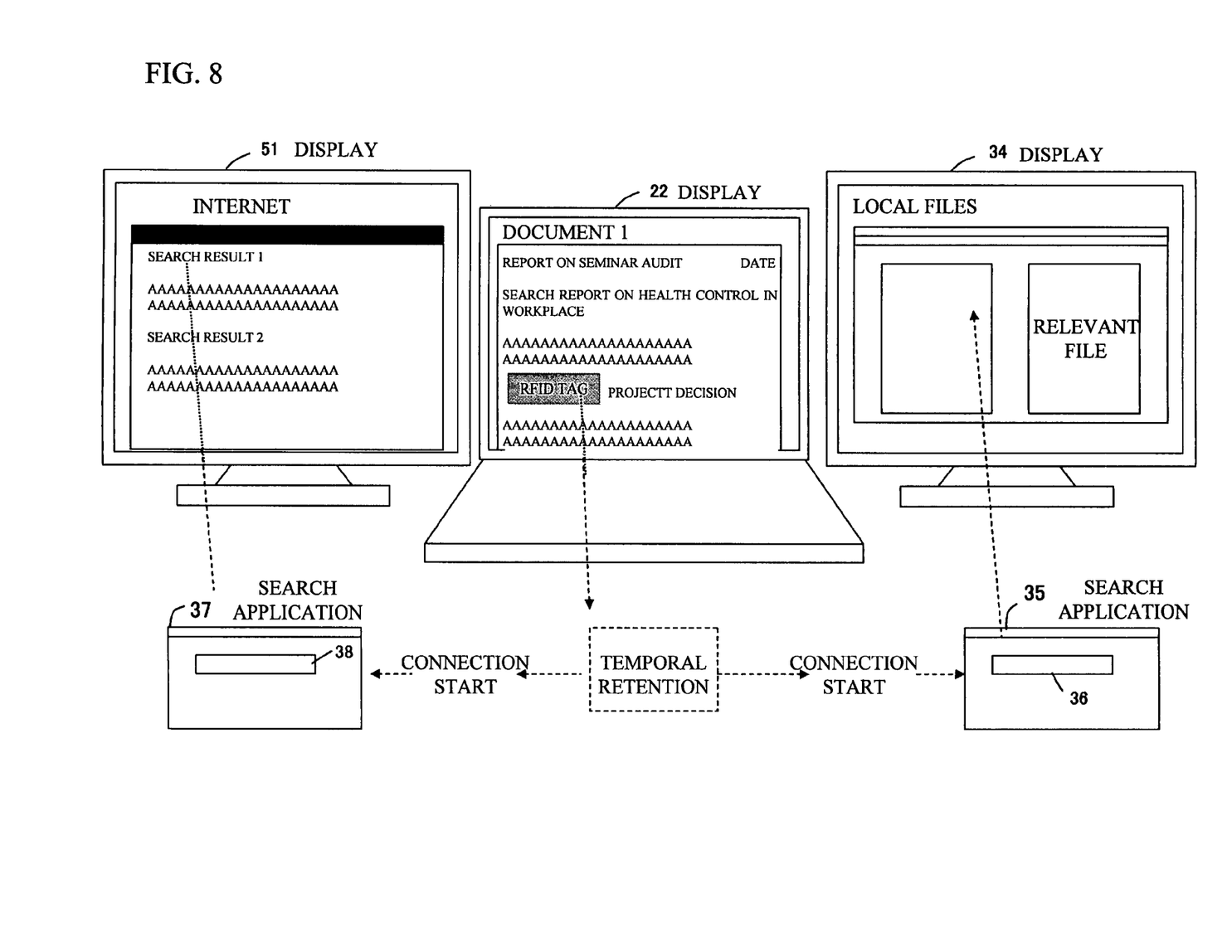
FIG. 8 is a view for explaining screens of displays, according to the second embodiment of the invention.

Next, descriptions will be given of a second embodiment of the invention. In the second embodiment, descriptions will be given of an example regarding display depending on how to designate a phrase when a user encounters the phrase necessitating peripheral information while the user views a document in a computer terminal. FIG. 5 is a diagram showing a structure of an information processing system 100 according to the second embodiment of the invention. FIG. 6 is a chart showing a flow of processing of the information processing system according to the second embodiment of the invention. FIGS. 7A and 7B are views for explaining a method of judging the highlight direction. FIG. 8 is a view for explaining screens of displays according to the second embodiment of the invention.

As shown in FIG. 5, in the information processing system 100, a computer terminal 5 is added to the information processing system 1 shown in FIG. 1. The computer terminal 5 has a communication section 51, a peripheral information request processing section 52, a display controller 53, and a display 54 similarly to the computer terminal 3. Each structure of the computer terminal 5 is similar to of the computer terminal 3. Therefore, descriptions thereof are omitted.

One of the examples corresponding to the second embodiment is as follows. A sales representative types words which should be checked as a memo into the computer terminal 2 which is a notebook PC when he or she is away from the office, then returns to the office and reads over the memo on his or her desk. In general, when words which should be checked are checked by utilizing the Internet, viewing operation in the computer terminal 2 is once stopped, a search application is started, a relevant phrase is inputted into the search application or copied and pasted in the search application to perform search. Otherwise, when related information is searched from files stored in the computer terminal 3, it is necessary to shift the operation to the computer terminal 3, and operations for search are newly commenced. Further, when search results from the Internet and local files are displayed in one computer terminal 3, external information and internal information are mixed, and the state easily becomes complicated. Therefore, when peripheral information related to a search target is searched for by multiple computers, the peripheral information request controller 25 selectively switches search computer terminals between the computer terminals 3 and 5 depending on the direction of selecting (highlighting) the search target.

In FIG. 6, first, the computer terminal 2, the computer terminal 3, and the computer terminal 5 establish connection (steps S301, S401, and S501), and the computer terminal 3 and the computer terminal 5 retain a state waiting a signal (steps S402 and S502). While a user views a document by means of the computer terminal 2, when the user encounters a phrase necessitating peripheral information, for example, when the user encounters "RFID tag," the user highlights the phrase by operating a mouse so that the search target can be visually identified (step S302). Then, when the peripheral information is desired to be searched for in local files of the right computer terminal 3, for example, the phrase is highlighted from left to right. On the contrary, when the peripheral information is desired to be searched for on the Internet by the left computer terminal 5, the phrase is highlighted from right to left. Otherwise, it is possible to search for the peripheral information in local files of the left computer terminal 5. Otherwise, it is possible to combine using the Internet by means of the right computer terminal 3 and using an intranet by means of the left computer terminal 5.

The highlighted phrase and the highlight direction are temporarily retained in the memory inside the peripheral information request controller 25 of the computer terminal 2 (Step S303). As shown in FIGS. 7A and 7B, the peripheral information request controller 25 secures the highlighted phrase in the form of an array and in the form of a character string. In the case that the search target is "RFID tag," when the search target is secured as a character string, a character string c becomes RFID tag. The peripheral information request controller 25 secures the headmost character in the highlight direction as an array number [0]. For example, FIG. 7A shows the case when the phrase is highlighted from left to right. On the contrary, FIG. 7B shows the case when the phrase is highlighted from right to left.

Next, as a highlight direction recognition processing, the peripheral information request controller 25 compares the headmost character of the character string c to the array number a[0]. When the both correspond with each other, judgment is made that the phrase is highlighted from left to right. On the contrary, when the both do not correspond with each other, judgment is made that the phrase is highlighted from right to left. Then, according to the judgment, the peripheral information request controller 25 decides the computer terminal to be connected (step S304). The peripheral information request controller 25 transmits the data retained in the memory to the decided computer by means of the communication section 24 (step S305). When the phrase is highlighted from left to right, the data is received by the communication section 31 (step S403). On the contrary, when the phrase is highlighted from right to left, the data is received by the communication section 51 (step S503).

The peripheral information request processing sections 32 and 52 start a search application based on the received data (steps S404 and S504). The peripheral information request processing sections 32 and 52 reflect the received data in the search text box 36 and a search text box 38 of the search application 35 and a search application 37 (steps S405 and 505), and performs search processing (steps S406 and S506). The display controllers 33 and 53 display search results on the display 34 and 54 (steps S407 and S507). Thereby, a user can intuitively operate the phrase necessitating the peripheral information in the memo described in the notebook PC as follows. That is, when the user highlights the phrase from left to right, the right computer is searched for the peripheral information stored in local files. Meanwhile, when the user highlights the Internet information from right to left, the left computer is searched for the peripheral information. In result, the user does not have to newly perform the operation to search for the peripheral information and the operation to secure all displays at a time. The user only concentrates on the operation to view the memo located in the center of the display 22.

In this embodiment, the local files are searched by the computer terminal 3, and the Internet is searched by the computer terminal 5. However, it is possible that the computer terminals 3 and 5 are not provided, and all search processing is performed by the computer terminal 2. In this case, the peripheral information request controller 25 may selectively switch search resource such as a local file and the Internet by the direction of selecting the search target. Thereby, by the simple operation of selection by highlight or the like, search resources such as the Internet, an intranet, and a local file can be selectively switched. Further, it is possible to multiply select search resources from right and left local drives, the Internet, and an intranet by a mouse with a cross key function.

Third Embodiment

Figure 9:
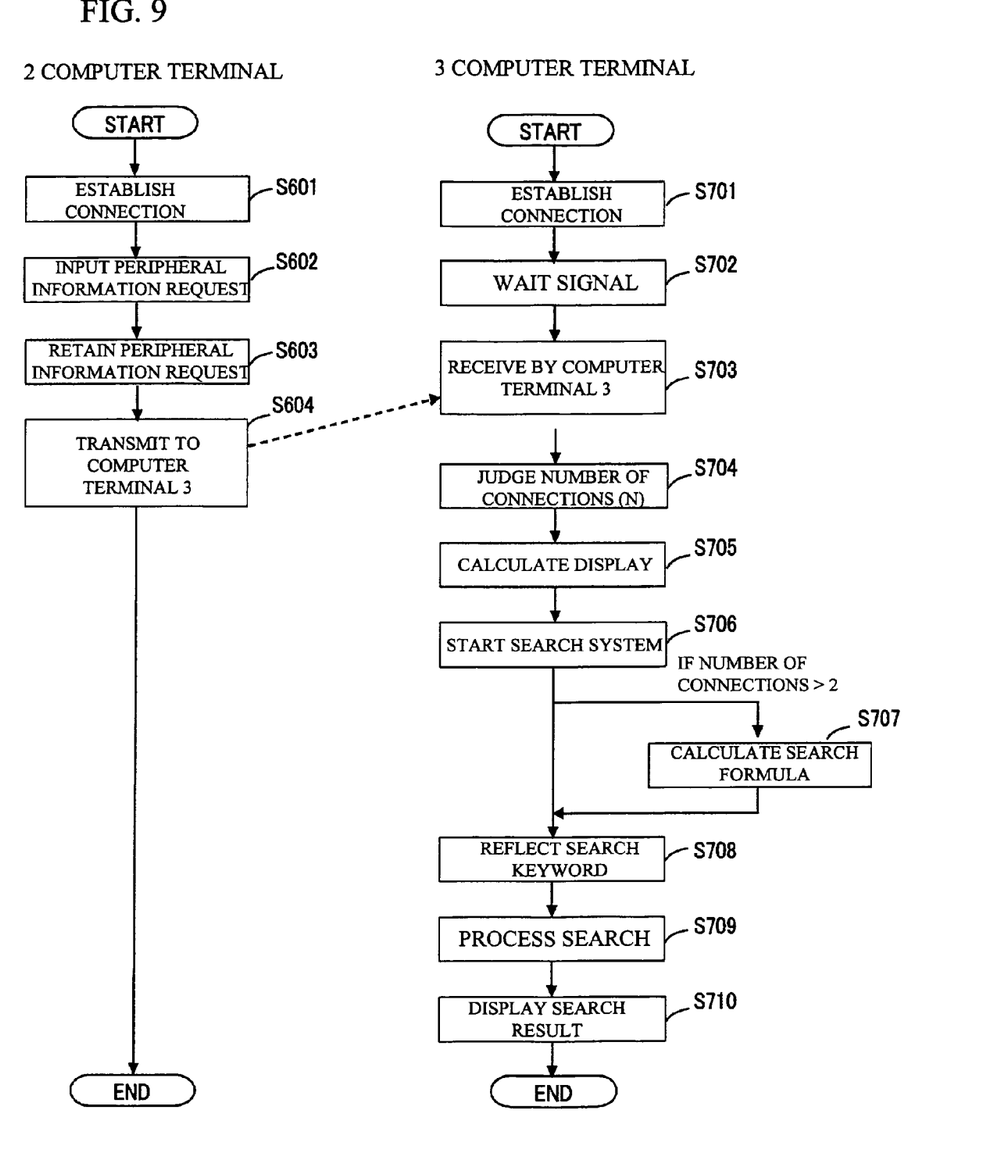
FIG. 9 is a flowchart of processing of an information processing system, according to a third embodiment of the invention.
Figure 10:
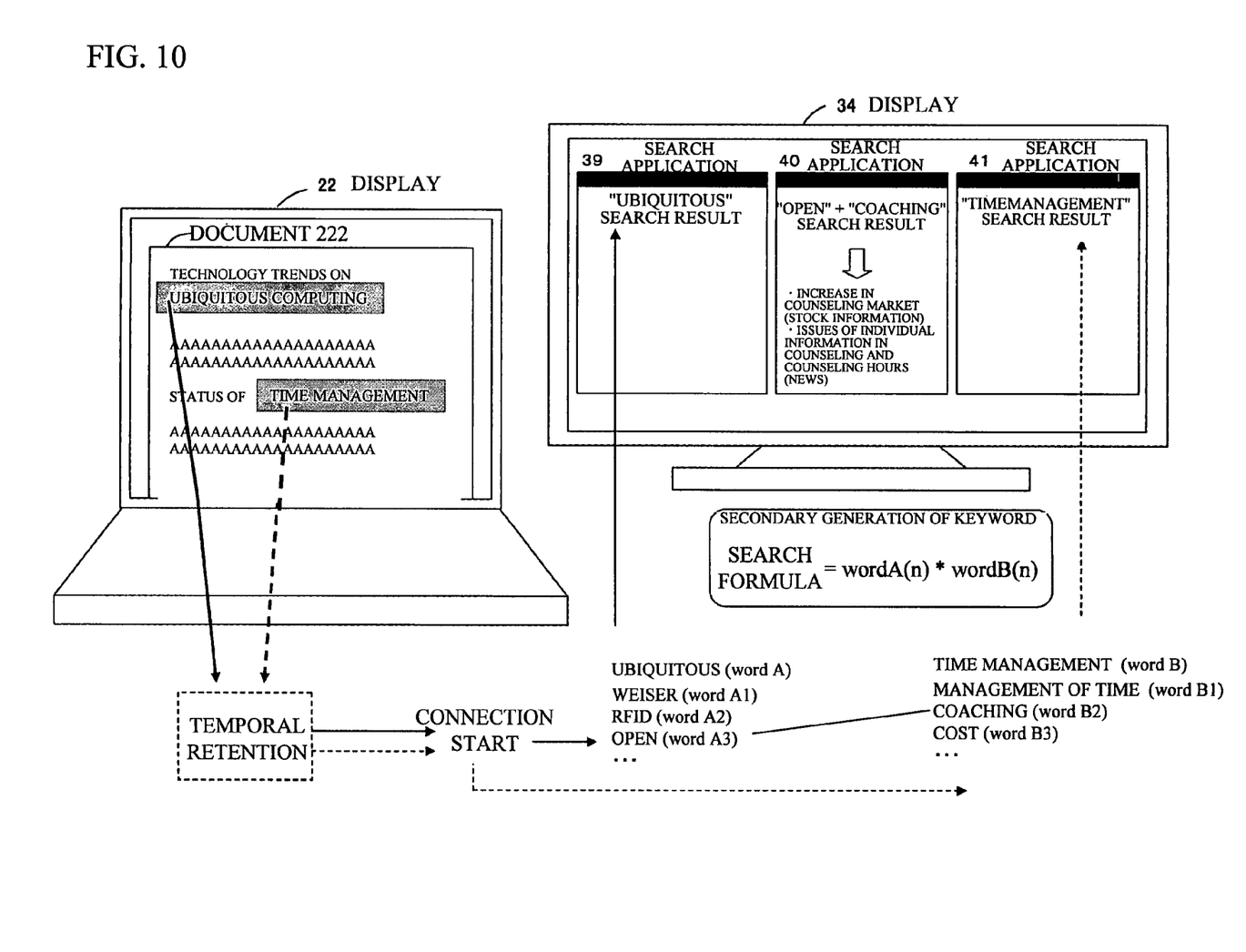
FIG. 10 is an explanation drawing which shows a model of screens in operation, according to the third embodiment of the invention.

Next, descriptions will be given of a third embodiment of the invention. Since the same structure as of the first embodiment is used in the third embodiment, descriptions will be given with reference to FIG. 1. In the third embodiment, descriptions will be given of an example regarding a display method in the case that a document is shown in the computer terminal 2, and peripheral information is searched for and displayed in the computer terminal 3 in cooperation with the computer terminal 2. FIG. 9 is a flowchart of processing of an information processing system according to the third embodiment of the invention. FIG. 10 is an explanation drawing which shows a model of screens in operation according to the third embodiment of the invention.

One of the examples corresponding to the third embodiment is as follows. For example, while a user creates a document to be used for presentation at customer's site in the computer terminal 2 which is a notebook PC, the user refers to local files and Internet information by utilizing the computer terminal 3, which is a desktop PC. In general, in the case that a user creates a document in the computer terminal 2 and the user necessitates peripheral information related thereto, documentation operation is once stopped, a file search application is started, and a relevant phrase 1 is inputted to the search application or copied and pasted in the search application to perform search. When related information is necessitated next time, a relevant phrase 2 is inputted to the search application again. That is, in the past system, each search target has needed each search operation. For example, in the past, search regarding a relevant phrase 3 derivable from the phrase 1 and the phrase 2 has been given up due to a large amount of workload. In result, in the past, chances to obtain peripheral information were small.

Therefore, the peripheral information request processing section 32 has the following additional function differently from in the first embodiment. The peripheral information request processing section 32 generates a search formula based on a search request in relation to a search target, and performs search processing by using the generated search formula. Then, when multiple search targets are designated by the peripheral information request controller 25, the peripheral information request processing section 32 generates a search formula by using the multiple search targets, and performs search operation by using the generated search formula.

Specifically, in FIG. 9, first, the computer terminal 2 and the computer terminal 3 establish connection (steps S601 and 701). The computer terminal 3 retains a state waiting a signal (step S702). While a user creates a document 222 for present research report by means of the computer terminal 2, when the user encounters a phrase necessitating peripheral information, for example, when the user encounters "ubiquitous" and "time management," the user highlights these phrases by operating a mouse so that the search targets can be visually identified. The highlighted phrases are temporarily retained in the memory inside the peripheral information request controller 25 of the computer terminal 2. Next, the data retained in the memory is transmitted to the computer terminal 3 by the communication section 24. The computer terminal 3 receives the data by means of the communication section 31 (step S703).

The peripheral information request processing section 32 starts the search application 35 of FIG. 3 based on the received data. Next, the number of times the user encounters phrases necessitating peripheral information is two or more, by judging the number of connections N (step S704), the display controller 33 performs display calculation processing (step S705). Next, the peripheral information request processing section 32 starts the information processing system based on a calculated display size and calculated position information (step S706). Further, when the number of connections is two or more, the peripheral information request processing section 32 performs calculation of a new search formula by using terms related to the phrases which are search targets based on a previously prepared dictionary (step S707).

The calculation of the search formula in step S707 can be performed by using Search formula=wordA(n)× wordB(n) . . . (1). For example, wordA (1) is a phrase itself designated by a user. In the search formula, AND operation of two phrases designated by the user is performed. WordA (2) is a subordinate concept or a peripheral word of wordA (1) designated by the user, which is randomly extracted from the previously prepared dictionary. For example, "Weiser," "RFID," "open" and the like can be cited as a subordinate concept or a peripheral word of "ubiquitous." "management of time," "coaching," "cost" and the like can be cited as a subordinate concept or a peripheral word of "time management."

For example, the peripheral information request processing section 32 extracts "open" as a related term of "ubiquitous" of the phrase 1, and extracts "coaching" as a related term of "time management" of the phrase 2 Related terms are randomly extracted and combined, and thereby a search formula which is not intentionally created by the user is created. Otherwise, it is possible that a search formula is created by simply adding each phrase sequentially. By the foregoing search formula (1), secondary peripheral information can be displayed. The peripheral information request processing section 32 reflects the search formula in search keywords (step S708), and performs search processing (step S709). Thereby, search processing of "open+coaching" is performed as peripheral information without intentional processing by the user.

As shown in FIG. 10, a result of the search processing of "ubiquitous" is displayed in a search application 39, a search result of "time management" is displayed in a search application 41, and a search result of "open+coaching" is displayed in a search application 40 (step S710). When the number of connections is one, the number of search requests is one, and therefore a requested word is directly searched for. Meanwhile, when the number of connections is two or more, in addition to the function to directly search for the secondary requested word, it is possible to perform search by multiplying the first word by the second word. That is why processing of the number of connections (the number of search requests) is included in the procedure.

Thereby, for example, the user can obtain "Increase in counseling market (stock information)" and "Issues of individual information in counseling and counseling hours (news)" which are displayed in a search application 40 without intentional operation. The user is suggested by the foregoing information. In result, additional values such as suggesting "automatic counseling system by automatic collection of domestic information" and "counseling on the Net by transferring only accumulated data" can be provided to the document in process of creation.

Fourth Embodiment

Figure 11:
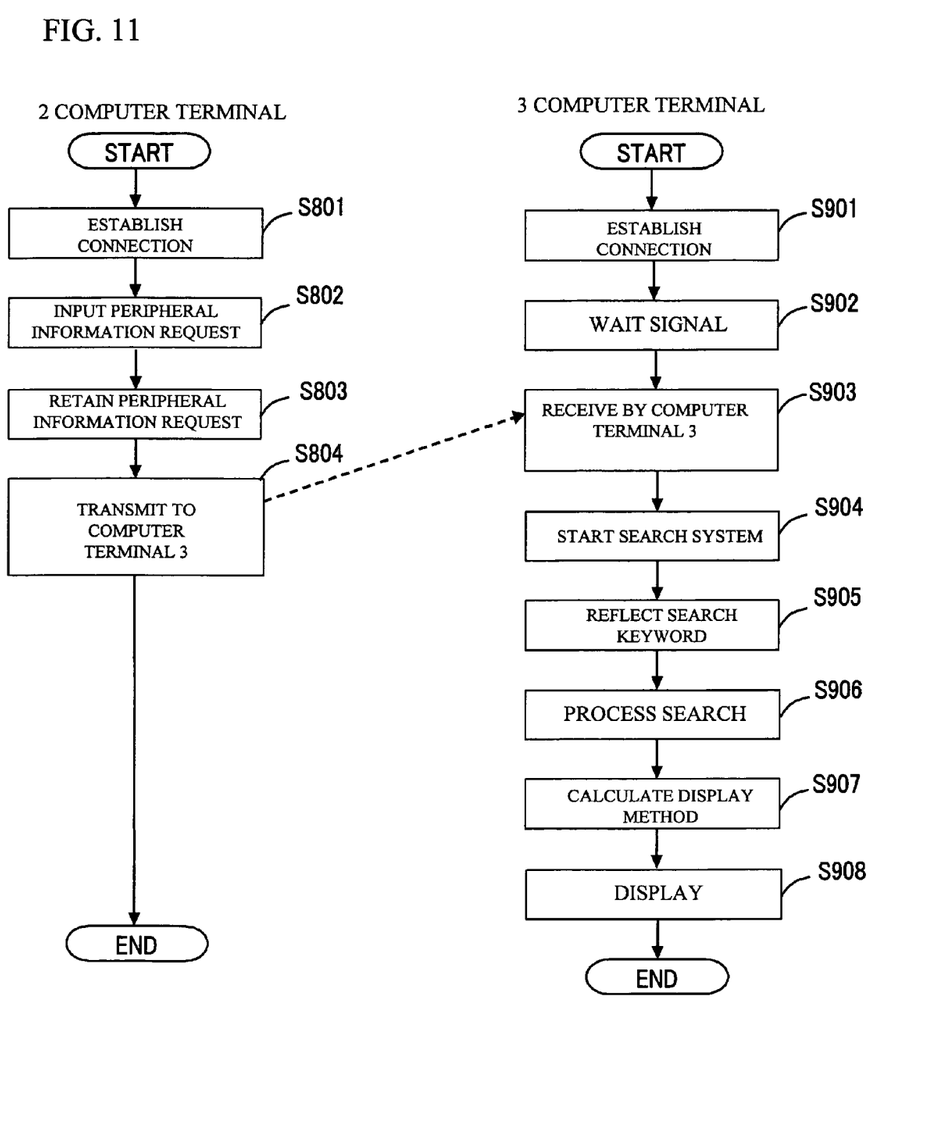
FIG. 11 is a flowchart of processing of an information processing system, according to a fourth embodiment of the invention.
Figure 12:
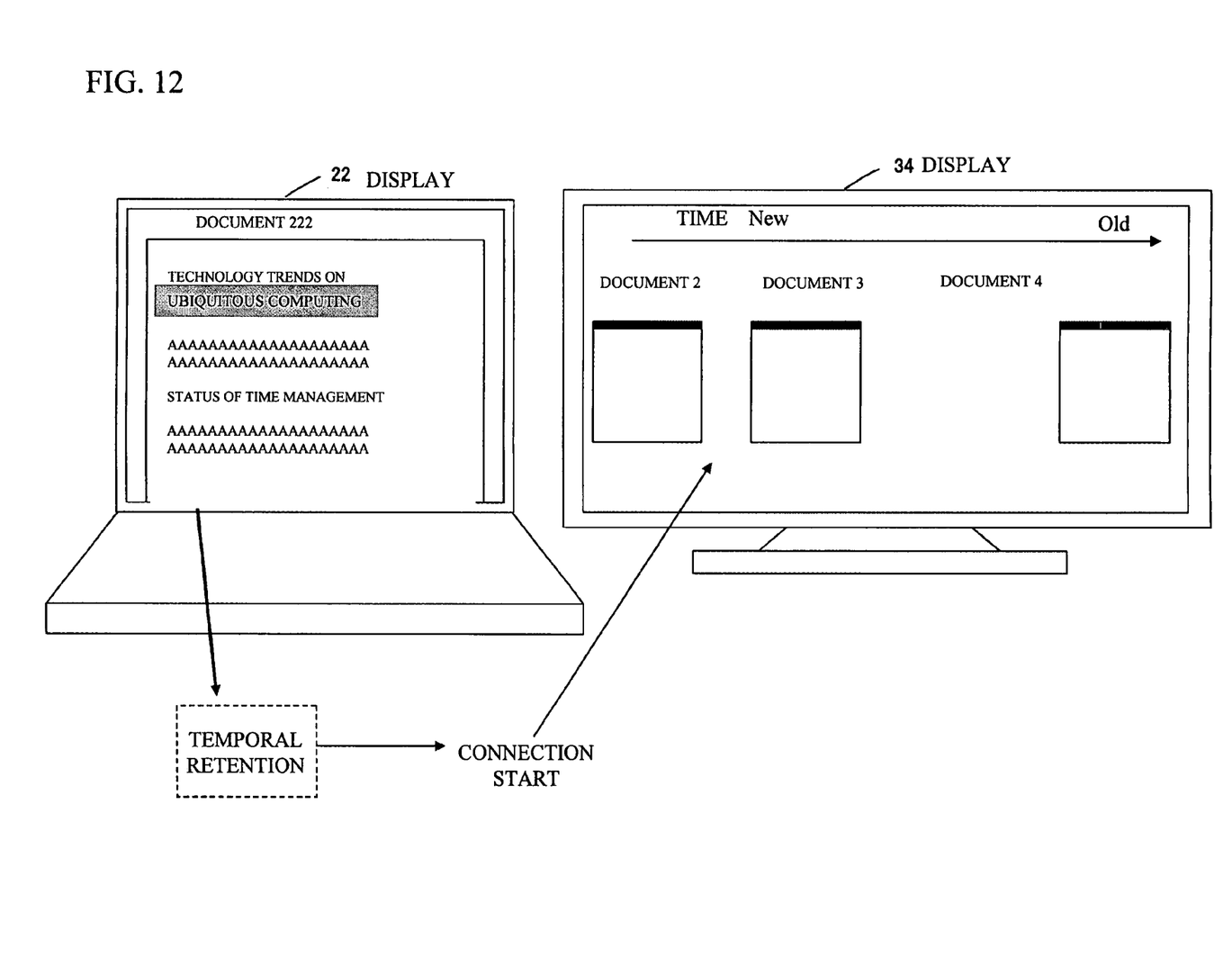
FIG. 12 is an explanation drawing which shows a model of operation screens of displays, according to the fourth embodiment of the invention.
Figure 13:
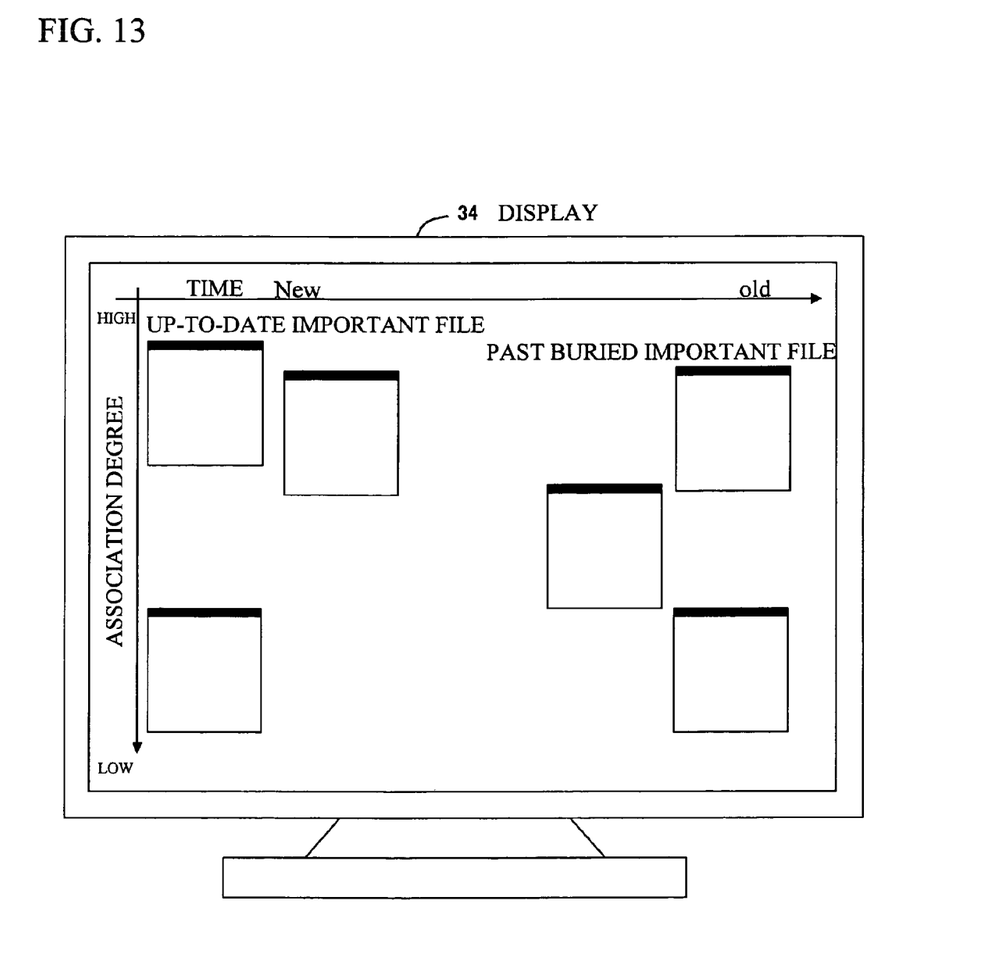
FIG. 13 is a view showing other display example of the display, according to the fourth embodiment of the invention.

Next, descriptions will be given of a fourth embodiment of the invention. Since the same information processing system structure as of the first embodiment is used in the fourth embodiment, descriptions will be given with reference to FIG. 1. In the fourth embodiment, descriptions will be given of an example regarding a display method in the case that a document is shown in the computer terminal 2, and peripheral information is searched for and displayed in the computer terminal 3 in cooperation with the computer terminal 2. FIG. 11 is a flowchart of processing of the information processing system according to the fourth embodiment of the invention. FIG. 12 is an explanation drawing showing a model of operation screens of displays according to the fourth embodiment of the invention. FIG. 13 is a view showing other display example of the display 34.

In FIG. 11, first, the computer terminal 2 and the computer terminal 3 establish connection (steps S801 and S901). The computer terminal 3 retains a state waiting a signal (step S902). While a user views the document 222 by means of the display 22 of the computer terminal 2, the user highlights a relevant phrase by operating a mouse so that the search target can be visually identified (step S802). Next, the peripheral information request controller 25 retains a peripheral information request (Step S803), and transmits the peripheral information request to the computer terminal (step S804). The communication section 31 of the computer terminal 3 receives the peripheral information request from the computer terminal 2 (step S903). The peripheral information request processing section 32 starts a search system, reflects a search keyword, and performs search processing based on the search keyword (steps S904 to S906). Next, the display controller 33 performs display calculation based on attribute information of searched information (step S907).

Then, the display controller 33 arranges search results considering creation time of day of each document. For example, the display controller 33 acquires update time of day of the searched information and a size of the display 34 of the computer terminal 3, and calculates a time proximity degree of the information. Then, the display controller 33 arranges new information in the vicinity of the computer terminal 2 addressing the central operation, arranges old information far therefrom, and thereby the information is communicated by visualizing freshness of the information. Based on such a result, the display controller 33 displays the search results as shown in FIG. 12 (step S908).

Further, as shown in FIG. 13, the display controller 33 uses association degree information in relation to the search target, acquires a size of the display 34 of the computer terminal 3, arranges information with a high association degree in relation to the search target in the vicinity of the computer terminal 2 addressing the central operation, and arranges information with a low association degree in relation to the search target far therefrom. The display controller 33 obtains the association degree in relation to the search target by utilizing general document attributes such as calling frequency of the document, update frequency of the document, update time of day of the document, and frequency of adding importance level when the document is attached to an E-mail. As shown in FIG. 13, two axis expression composed of the time attribute and the association degree can be utilized. Thereby, freshness of the information can be judged at a glance.

According to the foregoing respective embodiments, in connected multiple computers, when a request for presenting peripheral information associated with an original operation is accepted, the request is transmitted to other connected computer. The computer which receives a signal autonomously performs processing, and displays processing results based on the association degree with the original operation. Thereby, for example, when a user who returns to the office and creates a document on the computer terminal 2, information related to input words can be automatically searched for and such information can be presented to the user according to the association degree without interfering with the original operation.

Further, an information processing method according to an aspect of the invention can be realized by the foregoing information processing system. Further, the information processing method according to an aspect of the invention can be realized as a computer-controlled executable program. Such a program can be provided by distributing in the form of a magnetic disc, an optical disc, a semiconductor memory, or other recording medium. Otherwise, such a program can be provided by delivering via a network.

While the embodiments of the invention have been described in detail, the invention is not limited to such specific embodiments. Various modifications and alterations may be made within the scope of the invention described in the claims. For example, in the foregoing embodiments of the invention, the example of the case in which the information processing system is structured by using the multiple computers has been described. However, the invention is not limited thereto, but the information processing system may be realized by one computer. That is, in the information processing system of an aspect of the invention, as long as an environment in which multitasking can be realized such as multi-core, multi-CPU, multi-threading by a software is given, the number of computers (PC) can be one or plurality. Further, in the foregoing embodiments, the example using highlight as a method of visually selecting a search target has been described. However, other method such as drawing a ruled line for the search target can be used. Further, in the foregoing embodiments, the case using a text as an example of the search target has been described. However, the invention is not limited thereto. Further, search results and the like can be displayed audibly.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system that searches for peripheral information comprising:
   a display section that displays a document using a processor;
   a search request controller that specifies a search target in the document and creates a search request when the search target is highlighted by a user;
   an acceptance section that accepts the search target from the search request controller; and a search section that searches for information related to the search target based on the search request, wherein a result, which corresponds to information relating to the search target based on the search request that was searched by the search section, is displayed such that the result does not overlay the document being displayed by the display section;

wherein the search request controller selectively changes search resources based on directions of movement of highlighting the search target in the document; and wherein the search request controller is capable of selecting the search resources.

2. The information processing system that searches for peripheral information according to claim 1, wherein the search request controller selectively changes search computers based on directions of movement of highlighting the search target in the document.

3. The information processing system according to claim 1, wherein the search section performs search by using a term related to the search target.

4. The information processing system according to claim 1, wherein the search section performs search by using a search formula generated based on the search request in relation to the search target.

5. The information processing system according to claim 1, wherein the search section performs search by using a search formula generated by using a plurality of search targets when the plurality of the search targets are selected by the acceptance section.

6. The information processing system according to claim 1, further comprising a display controller that displays search results by the search section based on an association degree in relation to the search target.

7. The information processing system according to claim 1, further comprising a display controller that arranges and displays search results by the search section considering a created date and time of a document in the search results.

8. The information processing system according to claim 6, wherein the display controller calculates the association degree in relation to the search target by using at least one of a calling frequency of a searched document, an update frequency of the searched document, an update date and time of the searched document, and a frequency of adding an importance level when the searched document is attached to an E-mail.

9. An information processing method that searches for peripheral information comprising:

displaying a document in a given region;

specifying a search target in the document and creating a search request when the search target is highlighted by a user;

accepting the search target;

searching for information related to the search target based on the search request;

displaying a result, which corresponds to information relating to the searched search target, such that the result does not overlay the document being displayed by the display section;

selectively changing search resources based on directions of movement of highlighting the search target in the document; and wherein selectively changing search resources includes selecting the search resources.

10. The information processing method according to claim 9 further comprising selectively changing search computers based on directions of movement of highlighting the search target in the document.

11. A computer readable medium storing a program causing a computer to execute a process for information processing, the process comprising:

displaying a document in a given region;

specifying a search target in the document and creating a search request when the search target is highlighted by a user;

accepting the search target;

searching for information related to the search target based on the search request;

displaying a result, which corresponds to information relating to the searched search target, such that the result does not overlay the document being displayed by the display section;

selectively changing search resources based on directions of movement of highlighting the search target in the document; and wherein selectively changing search resources includes selecting the search resources.

12. The information processing system that searches for peripheral information according to claim 1, further comprising:

a second display section;

wherein the results is displayed on the second display section.

13. The information processing system that searches for peripheral information according to claim 12, further comprising:

wherein the processor at least indirectly controls both the first display section and the second display section.

14. The information processing system that searches for peripheral information according to claim 12, wherein the processor includes a first processor and a second processor;

wherein the first processor controls the first display section; and the second processor controls the second display section.

15. The information processing system that searches for peripheral information according to claim 1, further comprising:

a second display section;

wherein the results is displayed on the second display section.

16. The information processing system according to claim 1, wherein the directions of movement of highlighting the search target includes a left-to-right direction and a right-to-left direction.

17. The information processing method according to claim 9, wherein the directions of movement of highlighting the search target includes a left-to-right direction and a right-to-left direction.

18. The computer readable medium according to claim 11, wherein the directions of movement of highlighting the search target includes a left-to-right direction and a right-to-left direction.

* * * * *